United States Patent
Behrens et al.

(10) Patent No.: US 7,082,401 B2
(45) Date of Patent: Jul. 25, 2006

(54) DIGITAL SUBSCRIBER LINE NETWORK DEPLOYMENT METHOD

(75) Inventors: Clifford Allen Behrens, Madison, NJ (US); Tamra Carpenter, Skillman, NJ (US); Martin Eiger, Pine Brook, NJ (US); Hanan Luss, Marlboro, NJ (US); George Seymour, Monroe, NJ (US); Paul Seymour, Trenton, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1212 days.

(21) Appl. No.: 09/816,035

(22) Filed: Mar. 23, 2001

(65) Prior Publication Data

US 2004/0107122 A1    Jun. 3, 2004

Related U.S. Application Data

(60) Provisional application No. 60/191,797, filed on Mar. 24, 2000.

(51) Int. Cl.
*H04M 3/42*      (2006.01)
*G06F 17/60*     (2006.01)

(52) U.S. Cl. .......................... 379/201.05; 379/201.01; 705/7; 705/10

(58) Field of Classification Search ........... 379/399.01, 379/404, 201.05, 201.12; 705/10, 7
See application file for complete search history.

(56) References Cited

U.S. PATENT DOCUMENTS

| | | | | |
|---|---|---|---|---|
| 5,067,148 A * | 11/1991 | Sardana | ....................... | 379/111 |
| 5,270,919 A | 12/1993 | Blake et al. | ................. | 364/401 |
| 5,774,689 A | 6/1998 | Curtis et al. | ................. | 395/500 |
| 5,940,373 A | 8/1999 | Chiu et al. | .................. | 370/238 |
| 5,974,127 A * | 10/1999 | Wernli et al. | .......... | 379/201.01 |
| 6,393,290 B1 * | 5/2002 | Ufongene | .................... | 455/446 |

OTHER PUBLICATIONS

Guido Maier et al.—"Design and Cost Performance of the Multistage WDM-PON Access Networks"—Journal of Lightwave Technology, vol. 18, No. 2 —Feb. 2000 —pp. 125-143.

John R. Jensen et al.—"Improved Urban Infrastructure Mapping and Forecasting for BellSouth Using Remote Sensing and GIS Technology"—Photogrammetric Engineering & Remote Sensing, vol. 60, No. 3, Mar. 1994, pp. 339-346.

Telcordia Network Planner —"Making Next Generation Network Planning Easy"—2000.

* cited by examiner

*Primary Examiner*—Wing Chan
(74) *Attorney, Agent, or Firm*—Joseph Giordano; Philip J. Feig; Orville R. Cockings (57) ABSTRACT

A method for placing equipment in a network begins with a baseline network on which demographic data is analyzed statistically to produce a demographically-driven driven demand forecast model. The demand forecast model yields a predicted demand for each census block group. This can be visualized as one map layer with a GIS. The layout method takes the predicted demands as input and produces new attribute information for network nodes, the central office and cross-connects. By the layout method the cost of placing equipment at available placement sites or nodes is minimized based on various constraints, e.g., the capacity of the equipment to be placed, the distance a user is located from a potential node. Once the minimum cost for a given set of placement sites, subscribers, equipment capacity, and other known constraints is determined the equipment are then placed at these sites. These include the number and type of DSLAMs assigned to each node. These can be visualized with the GIS by clicking-on a node to expose the equipment deployed there.

29 Claims, 6 Drawing Sheets

DIGITAL SUBSCRIBER LINE NETWORK DEPLOYMENT METHOD

RELATED APPLICATIONS

The present application claims the benefit of U.S. Provisional Application No. 60/191,797 filed on Mar. 24, 2000 and entitled "Digital Subscriber Line Deployment Method".

FIELD OF THE INVENTION

This invention generally relates to methods and systems that perform network planning and in particular such method and systems that are used to design networks and deploy equipment in such networks, in particular broadband access networks.

BACKGROUND OF THE INVENTION

Demand for Internet access and convergent broadband services has required traditional or incumbent service providers to evolve into high-speed Internet and multimedia providers. One of the main drivers of this evolution or change is Digital Subscriber Line (DSL) technology. DSL has allowed service providers, both incumbent and competitive, to create approaches that address this demand, or opportunity, and has been serving as a key enabler of this paradigm shift. As a result, deployment of DSL products has been doubling every six months. As this momentum continues to build, with growth projections of more than 85% per year, efficiency and cost containment are becoming critical. In order to capitalize on this marketplace, service providers must be able to quickly forecast customer demand and deploy their resources as effectively as possible. In short, the need for superior planning is acute.

As the demand for broadband capability increases, network providers are faced with decisions on which access architectures to deploy in which service areas. The choice of DSL technologies varies based on network geography, customer service demand, pre-existing structures, and the specific design rules associated with each technology option.

DSL technologies work by connecting a pair of "DSL modems" to a subscriber's existing telephone line. One of these modems resides at the subscriber's premises, while the other is built into a line card at a Digital Subscriber Line Access Multiplexer (DSLAM) placed at either the central office or an appropriate cross-connect location in the field. Since subscriber premise modems are dedicated to each subscriber, their cost represents a fixed cost for DSL deployment. In contrast, DSLAMs are shared among subscribers and are expensive, so placing them judiciously can result in cost savings. DSLAMs are available in a number of different configurations that serve different numbers of subscribers at different cost levels. The variety of options and the potentially large number of subscribers make cost-effective placement of DSLAMs a complex problem.

In order to better understand the underlying problem, DSL may be viewed as being overlaid on an existing copper network within a single wire center. The existing copper network defines how subscribers are connected to the central office and dictates where DSLAMs can be placed. This network is logically a tree connecting subscribers to the central office. Typically, DSLAMs can be placed at the central office and suitable cross-connect locations in the field. However, in the context of long-range network planning, future subscribers to DSL are unknown, so forecasts can be a key driver for early deployment decisions.

The choice of DSLAM locations for a particular subscriber is further restricted by range constraints that impose limits on the allowable wire length from the subscriber to the serving DSLAM. This range limit is typically dictated by the type of DSL service, e.g., Asymmetric DSL (ADSL), Hybrid DSL (HDSL), Very high bit-rate DSL (VDSL), etc., to be deployed and the physical properties of the copper plant.

In general, prior art approaches to determining the location to deploy or place DSLAMs are manual in nature, requiring an operator to create a network architecture that will best meet future customer demand based on manual design rules. In particular, the demand models used by an operator suffer from the major shortcoming that the model is not directly related to potential short-term or long-term customer demand within a particular area. For example, a prior art approach comprises placing DSLAMs at the hubs of a hub and spoke model. By this deployment model the hubs are the host locations and correspond to either a corporate Local Area Network (LAN) or Internet Service Provider location. The subscribers are then connected via the spokes to the host location. This method or model for deployment is under-inclusive in that there may be many subscribers "beyond the reach of the host/hub" who desire DSL service. In addition, this method unnecessarily ties demand to the anticipated needs of large corporations and ISPs (Internet Service Providers). More importantly, deploying equipment in accordance with this methodology does not take into account future growth both within and outside the reach of the hub and is in no way related to a customer demand forecast.

Of utility then are methods and systems for placing and allocating DSLAM capacity to serve current and future demand for DSL service in a geographic area and which methods and systems are based on customer demand forecasts.

SUMMARY

Our invention is a method and system for placing DSLAM equipment to serve estimated demand for DSL service within a geographic area. Although our method is described below in the context of DSLAM deployment, it is also generally applicable to the deployment of other network equipment or architectures, e.g., Fiber To The Curb (FTTC) or other FTTx equipment or architectures.

In general our method begins with the selection of a planning area. The planning area may include a central office, cross-connects, copper facilities and subscriber locations within the planning area. The planning area may be conveniently thought of as comprising a baseline network or architecture having a tree structure wherein the copper facilities comprise the paths or branches interconnecting the cross-connects, central office, and subscriber locations; in addition, the cross-connects and central office comprise the nodes of the tree and serve as possible sites where DSLAMS may be placed. Based on the chosen planning area or existing baseline architecture a service demand model or demand forecast model based on socio-demographic data is used to generate a demand forecast for the area comprising the baseline network or its constituent sub-areas. The demographically-driven forecast is then used to generate a deployment plan or a demographically-driven network architecture wherein the DSLAMs are placed at selected nodes or sites in accordance with certain design constraints while minimizing deployment costs.

In accordance with an aspect of our invention, the demographics of the planning area are taken into account in determining DSL service demand within the planning area. That is, demographic data accessible from a geographic information system (GIS) database is used as input to the demand forecast model. In accordance with this aspect of our invention the planning area is linked to a geographic information system to produce a demographically-driven demand forecast model. As such our invention is able to evaluate DSL options and select the best option to deploy in a particular area.

The demographically-driven demand model provides input in determining the sites wherein DSLAM equipment may be placed while minimizing cost and satisfying other design constraints. The sites for DSLAM placement are then displayed as a network tree wherein each site is interconnected. The network tree that is generated includes identification of the sites at which the equipment is to be located and for each site or node the number and type of equipment that needs to be deployed.

In accordance with an object of our invention, demographic data is advantageously accessed from a global information system (GIS) database and used to create a demographically-driven demand model. By utilizing the GIS database our invention is better able to estimate the demand within an area. Further in accordance with our invention, our method for developing a demographically-driven demand model includes determination of the number of households in each neighborhood block estimated to buy service.

Our method therefore advantageously allows a service provider to deploy equipment in a manner that meets near-term demand while at the same time providing for future growth within an area. In addition, our method is not under-inclusive and depends more on consumer's ability to pay and other characteristics that make it more or less probable that consumers within an area will be DSL service subscribers.

DETAILED DESCRIPTION

Figure 1:
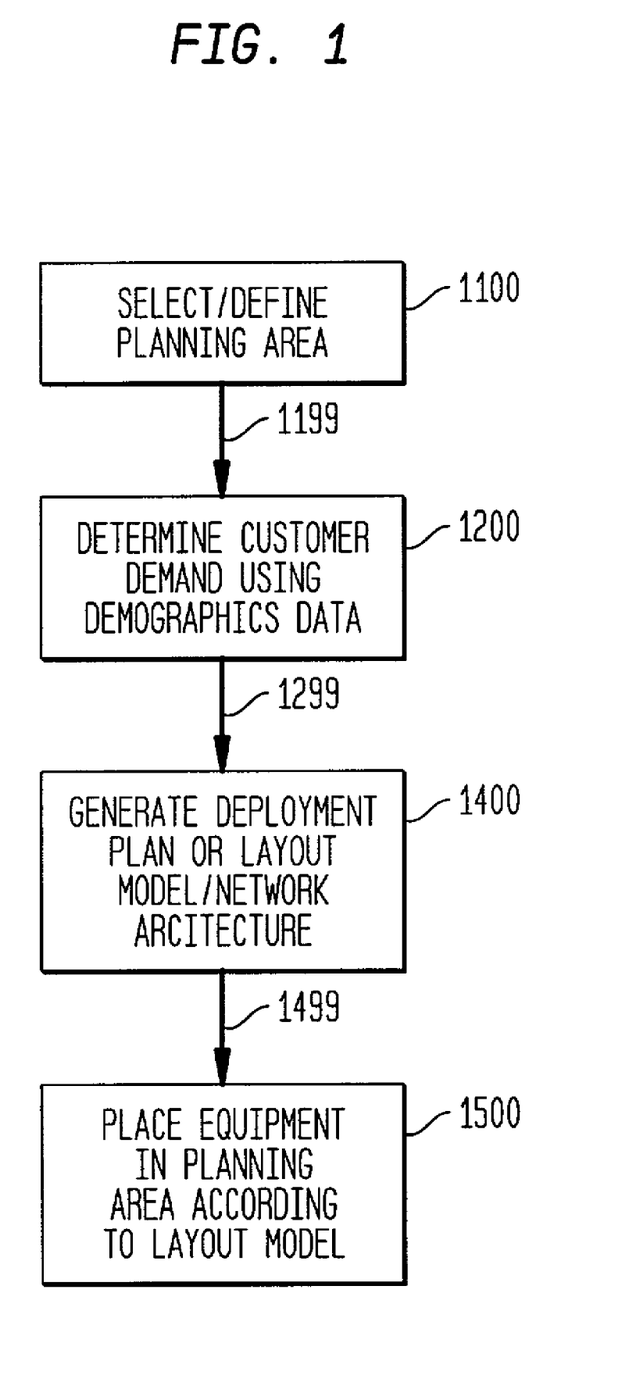
FIG. 1 is a flow chart of the method steps for deploying network equipment in accordance with our invention.

Turning to FIG. 1 there is illustrated a flow chart of the method steps of our invention. As FIG. 1 shows, the method begins with selecting or defining a planning area, block 1100. The selected planning area is then used to determine customer demand based on a demographically-driven service demand model and forecast, block 1200. The demographically-driven demand forecast is then used as input to generate a deployment plan or layout model/network architecture, block 1400. The demographically-driven demand plan or network architecture places equipment in the network, block 1500, at candidate sites.

Figure 2A:
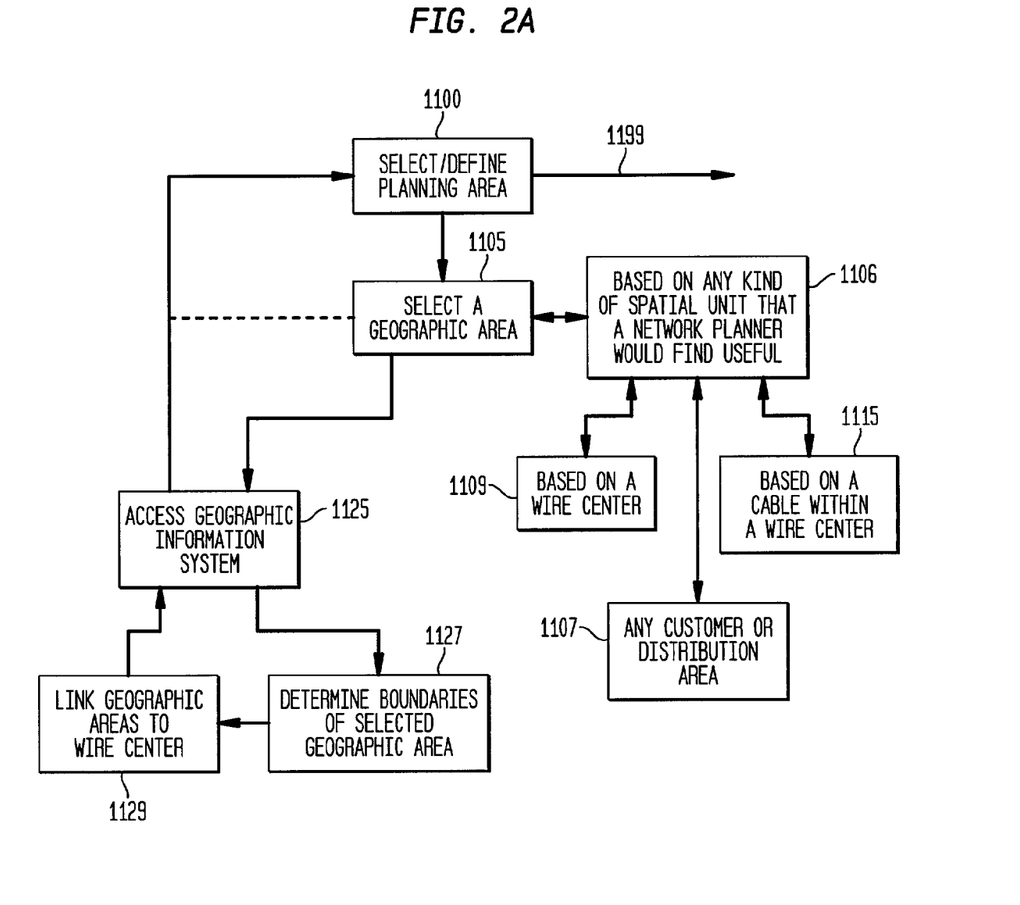
FIG. 2A depicts the steps for selecting a planning area in accordance with the present invention.

Turning now to FIG. 2A there is illustrated the substeps, blocks 1105 to 1129, for defining a planning area (block 1100 of FIG. 1). As FIG. 2A shows, the first substep of defining a planning area is selecting a geographic area, block 1105. In general, and in accordance with our invention, any type of spatial unit that a network planner would find useful can be used in selecting the geographic area, block 1106. For example, a geographic area could be selected based on any customer or distribution area 1107, a wire center 1109, or a specific cable facility within a wire center 1115. The selected geographic area essentially defines the scope of the deployment problem. Choosing an entire wire center creates a larger and more difficult problem because a wire center typically covers a fairly large geographic area having many customers. Accordingly, less computing resources are required if the geographic area is limited to a cable within a wire center 1115. On the other hand, it should be noted that the deployment plan or network that is the output of our invention changes depending on the input. Therefore, although more difficult computationally, it may be more efficient, with respect to cost, to define an area having an entire wire center comprising the planning area. Moreover, the accuracy of the demand forecasts is improved by increasing the number of sampling units, hence demographic variability, in the planning area.

In accordance with an embodiment of our invention, once the geographic area is selected, block 1105, a geographic information system (GIS) may be accessed, block 1125, to ascertain demographic information on the subscribers within the selected geographic area. As those of ordinary skill in the art will know, the GIS is a very useful visual aid that can be used, and was used in our implementation, to select the geographic area, 1105. The information from the GIS database may be used to determine the boundaries of the selected geographic area, block 1127, and to link the geographic area to a wire center or centers, block 1129.

Figure 2B:
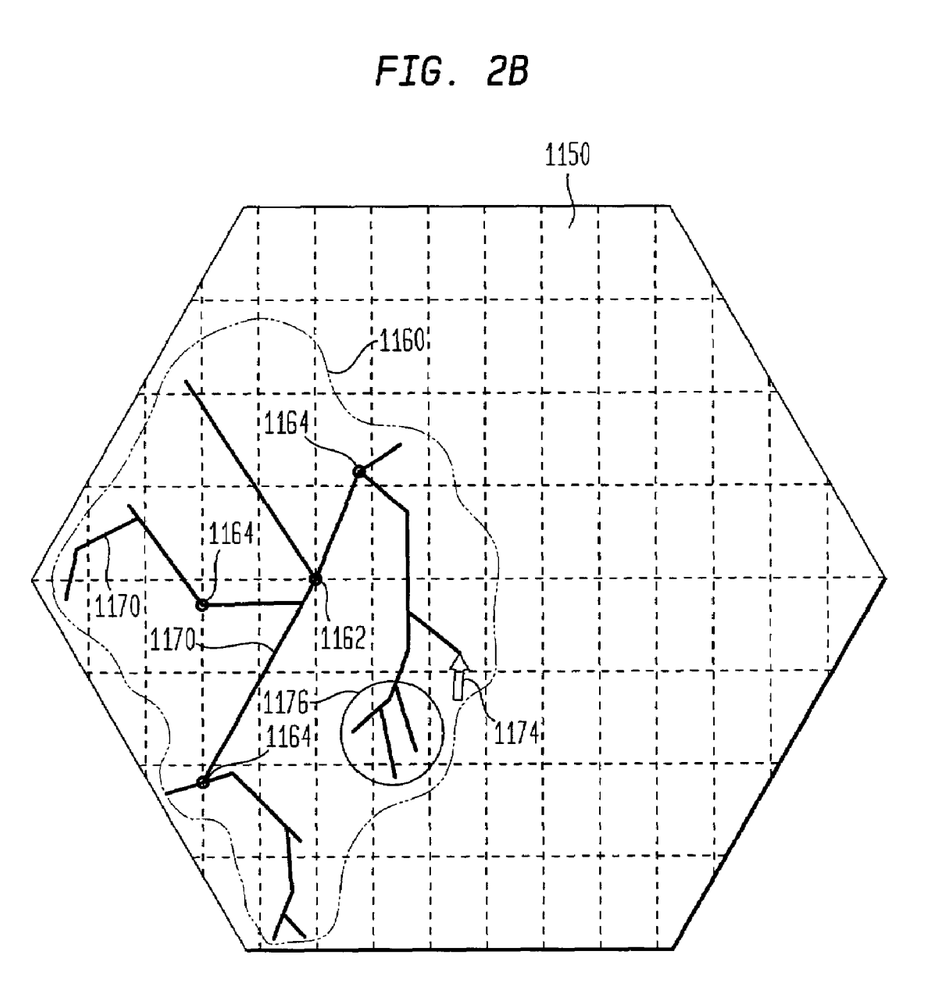
FIG. 2B depicts an exemplary planning area and accompanying baseline network architecture of the copper cable facilities within the exemplary planning area.

An exemplary display of wire centers linked to the geographic area based on the information accessed from the GIS database is shown in FIG. 2B. The database should include information on individual census block group boundaries 1150. As discussed below, the information in the database may also include wire center map boundary information, the central office within a wire center, etc.

As FIG. 2B shows, the wire center information that is obtained from the GIS may be used to create a network tree 1160, having central office 1162 and cross-connects 1164, which are interconnected by the copper cables 1170 that also connect the potential subscribers 1174 (more than one subscriber was not shown to avoid clutter). This network tree 1160 represents a baseline network having many sites wherein DSLAM equipment may be placed, i.e., central office 1162 and cross-connect 1164, so as to provide DSL service to the potential subscribers who are also connected to the network tree. The problem therefore becomes one of placing the DSLAMs at the available sites, given customer demand and network design constraints, while minimizing deployment costs.

With the geographic area selected the next step in our method, returning to FIG. 1, is that of determining subscriber demand, block 1200. In accordance with our invention subscriber demand is demographically driven, as indicated by the steps illustrated in FIG. 3. That is, subscriber demand is determined from or based on demographic information available in a GIS.

Figure 3:
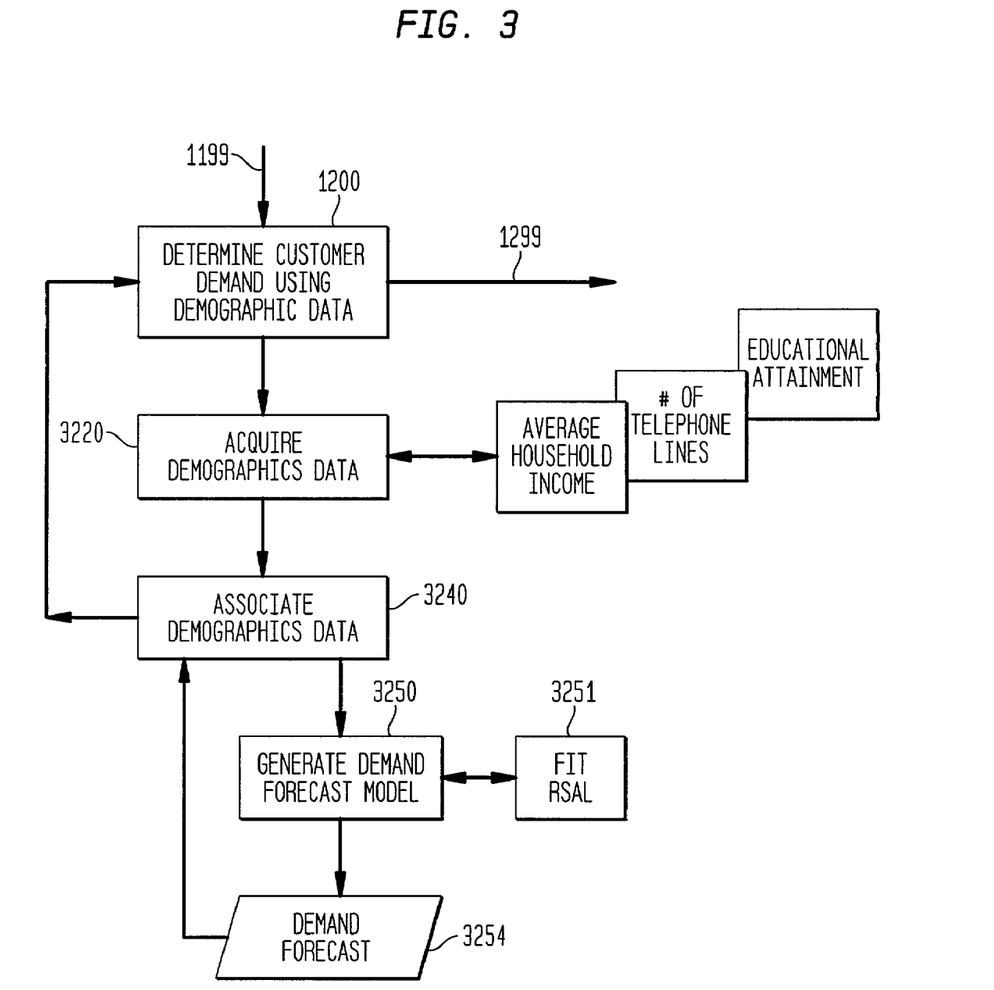
FIG. 3 depicts the steps for determining customer demand in accordance with the present invention.

With reference to FIG. 3, once the demographic data is available we then associate the demographic data with the planning area, block 3240. It should be noted that GIS databases are commercially available and we have found that such a database should include the following geo-referenced data layers or information:
1) Wire Center boundary information
2) Central Office locations within these Wire Centers
3) Map of copper network within these Wire Centers
4) Precise location of nodes where DSLAMS might be deployed
5) Cable connections joining nodes
6) Street map for wire centers (In vector format with feature files needed to identify Census Bureau within block groups)
7) US census block group boundaries
8) Thematic map layers Census Bureau's Block Groups contained within the study Wire Centers including
   a) Average household income
   b) Average days/week work at home
   c) Average number of telephone lines (if available)
   d) Average commute distance to work or average number of days/weeks work at home (if available)
   e) Average educational attainment (if available)
   f) Employment profile by job class (if available)
   g) Proportion of single and multi-family residences
9) DSL service profile for the equipment being deployed.
10) Map of the Fiber network in these locations The information or data listed above is meant to illustrate data that is useful in performing an accurate forecast. Accordingly, all of the above information need not be used to get an accurate forecast. On the other hand, depending on the population make-up of the area certain data will better predict demand than other data, as indicated below. In addition, the above list of information is not meant to be exhaustive. In fact, there may be other information that may be useful in determining service demand.

In associating the GIS data, block 3240, relevant demographic data for each block group in the study area is selected, including a response variable such as average household interest in high-speed service and a collection of predictor variables, e.g., average household income, average educational attainment of household head, average number of phone lines, etc. A user can select any of these variables to estimate the proportion of households in a block group that are likely to subscribe to DSL services or other broadband services.

An estimate of the households likely to subscribe, block 3250, is obtained, in accordance with our invention, by fitting a Mixed Regressive-Spatial-Autoregressive Logistic (MRSAL) model to the selected data, block 3251. Our MSRAL model exploits spatial patterning and temporal relationships to improve the forecast by exploiting spatial relationships. For example, if a census block group will subscribe to service then it is more likely that a neighboring census block group will also subscribe to service. Our model is of the following form:

$$P(W; x_1, x_2, \ldots, x_k) = 1/[1+\exp\{-(\alpha+\rho WP+\beta_1 x_1 + \beta_2 x_2 + \ldots + \beta_k x_k)\}],$$

where:
P=probability of a household subscribing to xDSL services;
W=a spatial weights matrix whose values take on a nonzero value when census block groups are neighbors and a zero value otherwise;
ρ=the spatial autoregressive coefficient or effect of spatial dependency on P while controlling for the effects of the $x_i$;
$x_i$=predictor variable i;
k=number of predictor variables;
α=constant (to be determined); and
$\beta_i$=effect of predictor i on P (to be determined).

At the block (i.e., neighborhood block) level, all subscribers are assumed to home onto the network through the same cross-connection location, thereby eliminating the need for further desegregation. Demand is then the estimated number of DSL subscribers on a given block. The association between demographics in the planning area and the resulting estimate produce a demographically-driven service demand forecast. In accordance with an embodiment of our invention, the DSL forecasts for all block groups within a planning area may be displayed on the GIS display. Note, however, that in accordance with our invention the important aspect is not the actual display of the demographically-driven information nor the form of the display, instead it is use of demographics to drive the demand model or forecast. Those of ordinary skill in the art will note that the idea here is to determine which variables are useful predictors, given those available, and use the GIS framework to estimate the demand forecasts needed by the placement algorithm.

In addition, in some cases use of neighborhood information may not be warranted or necessary when forecasting the demand. Neighborhood information is an additional term that is used to improve the precision of the forecast thus all the values of W may be set to zero making the term ρWP in the above expression equal to zero. In this case, the forecast is made only with the demographic data (the $x_i$'s) with no spatial effects.

In the end, a demand forecast is produced, block 3254, as result of application of our demand model. This demand forecast, block 3254, can be used to seed a GIS database, appearing in the database as datalayer.

With reference to FIG. 2B, the estimate may affect the network tree 1160 by indicating that certain branches 1176 on the tree may be removed because the forecasted demand for service in that census group is below a predetermined threshold. Specifically, it may not be profitable to service an area where only 30% of the census block group will desire service.

Figure 4:
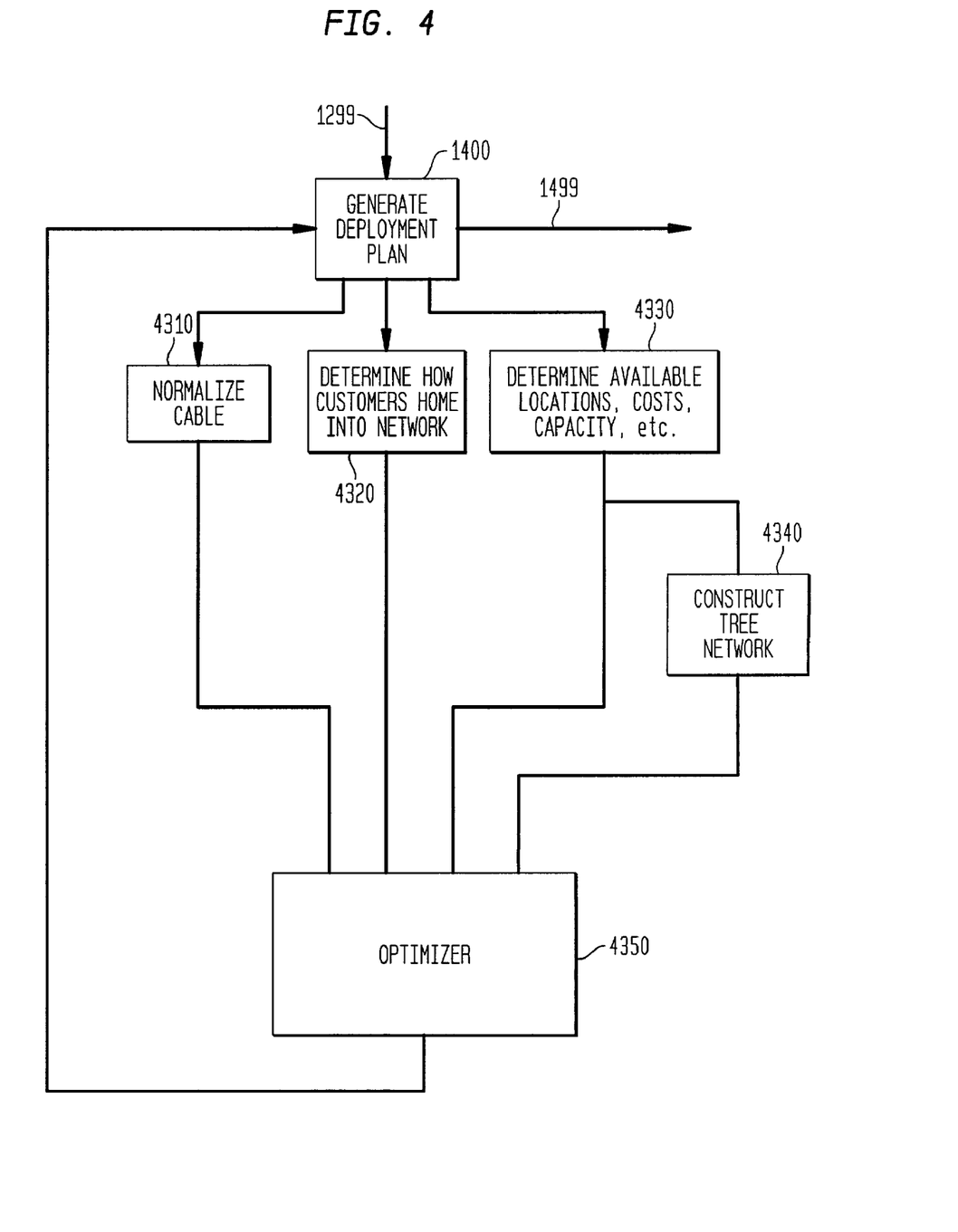
FIG. 4 depicts the steps for generating a demographically-driven deployment or network architecture in accordance with the present invention.

At block 1400, FIG. 1, the demand forecast obtained from the demand forecasting model above is used as an input to produce a deployment plan or demographically-driven network tree (or map) showing the actual location of the equipment and the capacity of each of the DSLAMs to be deployed; note, the GIS display may be used to visualize a map of the deployment plan having the actual location of the newly placed DSLAM equipment. Turning to FIG. 4, there is depicted the steps for generating a deployment plan in accordance with the present invention. In order that the demographically-driven demand or deployment map may be generated, the length of the cable connecting each potential customer is normalized, block 4310. Cable normalization 4310 is necessary because the cable, or subscriber loop, connecting any given customer may be made of several different gauges, e.g., 26 or 24 gauge cable, with different attenuation properties. That is, cable gauges may differ from one customer to another. At block 4320, using the demand for each block a determination is made of how each block homes onto the existing baseline network. For example, it may be assumed that each subscriber in a census block homes onto the baseline network tree through the same cross-connect location or site. At block 4330, the available locations for placing the equipment, along with the cost, capacity, and maximum reach of the equipment is determined. At block 4340, a tree network connecting all the available locations or sites for the equipment is constructed. Using the results from blocks 4310–4340 as input, optimization is performed, block 4350, to place the DSLAMs at the available or designated sites and customers are assigned to serving locations so that the total cost of the DSLAMs is minimized.

The output from the optimization process provides two types of information. For each demand location, the site at which its serving DSLAM is located is identified; these sites may be conveniently referred to as network nodes. For each network node, the set of DSLAMs (possibly none) to place is specified. With this information, the total deployment cost is computed and includes: cost of modems; cost of DSLAMs; and since the DSLAM locations define where the cutover between fiber and copper occurs, the cost of fiber may also be included. The configuration of the DSLAM is arbitrary and can be defined by the user, i.e., DSLAMs have a common housing and capacity is installed in modular components. In implementing the present invention we chose four "virtual" DSLAMs, at 25%, 50%, 75%, and 100% utilization. Note however, that our method can accommodate any set of virtual DSLAMs.

For example, if a network or service provider desires to determine where DSLAMs should be placed in a geographic area to support Asymmetric Digital Subscriber Line (ADSL) technology, the optimization method or optimizer, block 4350, would operate as follows. The optimizer takes as input: the set of DSLAMs available to place; the "tree" network (refer to FIG. 2B) that connects all of the candidate DSLAM sites (one of which is the central office 1162 of FIG. 2B); customers with their associated homing sites; and the maximum allowable distance between a customer and its serving DSLAM. Given this information, the optimization method places DSLAMs at designated sites, 1164 FIG. 2B, and assigns customers to serving locations so that the total cost of the DSLAMs is minimized and so that certain design constraints are satisfied. For the ADSL design problem these constraints assure that: 1) no customer is too far from its serving DSLAM; 2) no DSLAM serves more customers than its allowed capacity; 3) all customers are served at a site along the path to the central office; and 4) any two customers whose copper wires meet on their path to their serving DSLAM must be served at the same DSLAM location.

The constraint on the length of copper to the DSLAM ensures that a customer receives sufficient signal strength and quality. The second constraint is a capacity constraint at the DSLAM. The third constraint arises because ADSL is typically deployed on top of an existing copper loop. By assigning customers to be served at DSLAM locations along the path to the central office or root, we guarantee that no additional copper needs to be installed. Note however, that the constraint that a subscriber must be served along the path to the central office is a constraint owing to overlaying the new network onto the existing plant. This constraint could be relaxed where newer network types, such as FTTC, are being considered for deployment. Finally, the fourth constraint is something of a regularity constraint that seems to produce designs that "look right" to network designers and will be easier to maintain. This constraint is a pivotal assumption underlying the optimization algorithm.

The optimization method is a "dynamic programming" (DP) method. It begins at the leaves of the tree formed by the DSLAM locations and works from the leaves to the central office.

In general, dynamic programming is a method for solving optimization problems that have a large search space but are structured in such a way that it is possible to "grow" a full solution from optimal partial solutions. A common thread in dynamic programming is solving a complex problem by solving a sequence of simpler problems. In ADSL design or any DSL design (HDSL, SDSL, VDSL), we begin by solving small problems at the leaves of the tree. At a particular leaf, we must decide whether to serve the customers that home there with a DSLAM at that node or at some node closer to the central office. If we decide to serve the customers at that leaf, then we must place a DSLAM there, so we'd choose the cheapest DSLAM (or combination of DSLAMs) that can serve the subtending customers. If we decide to serve these customers closer to the central office, then the cost at the current leaf is zero, but these customers must percolate up the tree (toward the central office) until they are served by some DSLAM.

Typically, solving a dynamic program involves a certain amount of book-keeping that is handled by defining an "optimal-value function". The optimal-value function maps (in this case) decisions into costs. A key property of a the optimal-value function is that we can grow solutions by manipulating optimal-value functions.

To describe our method, it suffices to describe its optimal-value function. We will do that after we define a few helpful terms. First, and by way of reference to FIG. 5, a "node" 510 refers to any potential DSLAM location (including a central office 515). The "parent" of any node is the first node on the path between it and the central office. The "children" of a node are the ones that have that node as a parent. For any given node, we refer to its "induced subtree" as being all nodes and customers (including the node itself) that must cross this node to reach the central office. Finally, the direction "up the tree" is from a node toward the central office and "down the tree" is from a node toward the leaves 516.

At a high level, an optimal-value function is computed at every node and it tells us how much it will cost to serve the customers in that node's subtree when they are served in a particular way. We compute the optimal-value function for a parent node directly from the optimal-value functions of its children.

For the current problem, the optimal-value function is rather complicated. The optimal-value function is c(P,V,n) which represents the least cost of serving all of the customers in node P's subtree except for n of them that are served at node V, where V is a node on P's path to the central office.

The method begins at the leaves of the tree (i.e., the nodes with no children) and proceeds up the tree, computing the optimal-value function for non-leaves only after the functions for their children have been computed.

Figure 5:
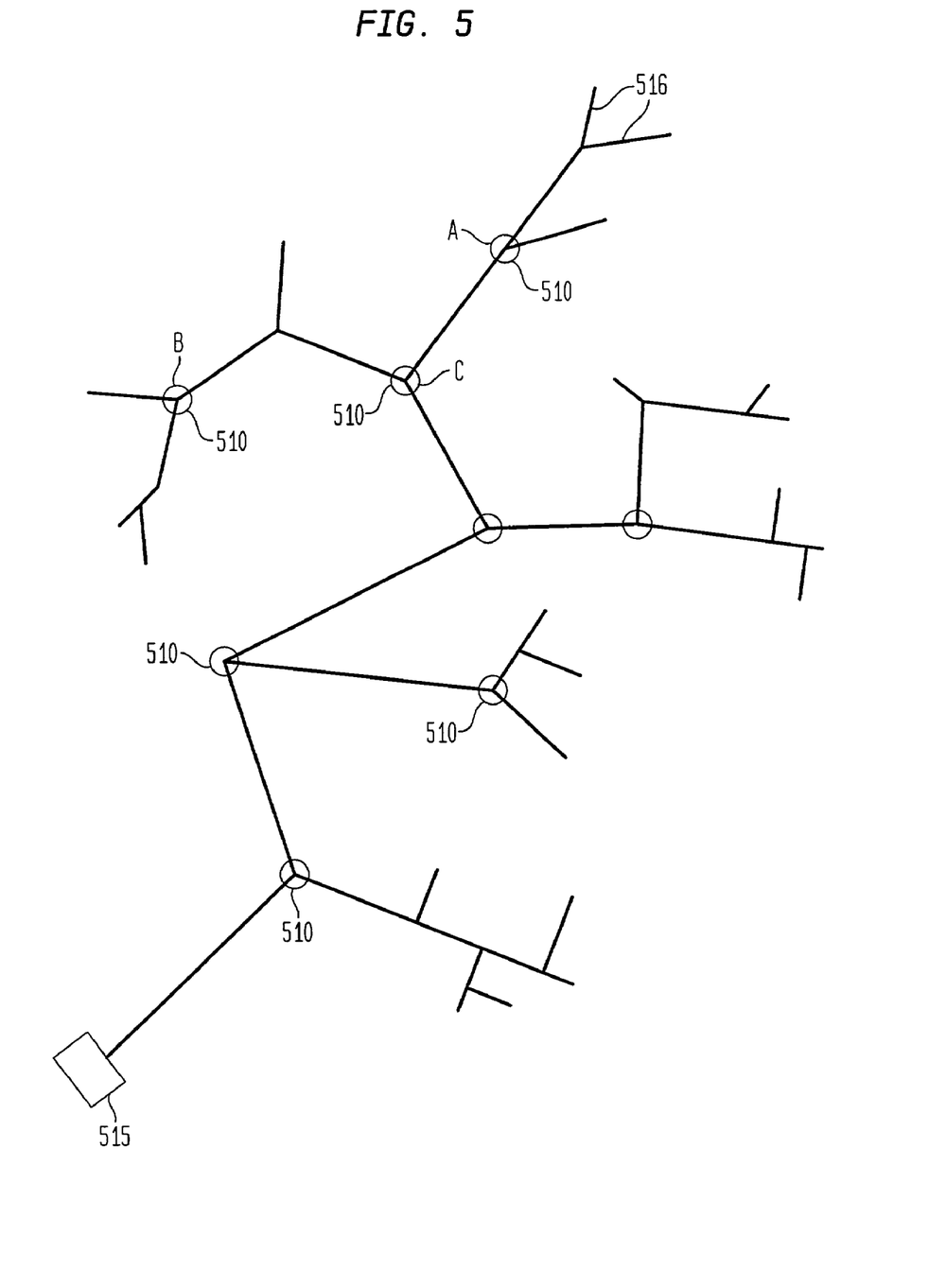
FIG. 5 is an exemplary network tree diagram having candidate DSLAM sites for equipment placement in accordance with the present invention.

To illustrate and with reference to FIG. 5, well provide a very small example. Suppose, that we have DSLAMs with the following costs and capacities:

| COST | CAPACITY |
| --- | --- |
| 1000 | 200 |
| 1500 | 400 |

Now suppose that we have nodes A and B that are children of node C and that there are 300 customers homed to A, and 200 homed to B and C. We'll let X denote any particular ancestor of C that all customers homed to A, B, and C can reach. For node A: We must serve either all or none of the houses that home at A at node A. Thus, we either serve all 300 at A, or we serve them at node C or somewhere above C.

c(A,C,300)=0 (The cost at A is 0 because we don't need a DSLAM)
c(A,X,300)=0 (The cost at A is 0 because we don't need a DSLAM)
c(A,C,0)=1500 (We need a DSLAM at A)
c(A,X,0)=1500 (We need a DSLAM at A)

The case at node B is analogous:
c(B,C,200)=0
c(B,X,200)=0
c(B,C,0)=1000
c(B,X,0)=1000

Now, the case at node C must combine information from its children. Note that if a DSLAM is placed at C, then customers homed to A and B must be served at or below C. This somewhat simplifies the calculation below.

c(C,X,700)=0 (The cost at C is 0 because custs are served at X)
c(C,X,500)=1000 (which is c(B,C,0)+c(A,X,300))
c(C,X,400)=1500 (which is c(A,C,0)+c(B,X,200))
c(C,X,200)=2500 (which is c(A,C,0)+c(B,C,0))
c(C,X,0)=3000 (which is the cheapest combination of DSLAMs to serve all customers at C)
Note that this is less than:
c(A,C,0)+c(B,C,0)+cost to serve 200 at C If C were in fact the central office, we'd see that the cheapest way to serve the given set of customers would be $3000. Needless to say, a realistic-sized problem could require very large structures to store the optimal-value information.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated. Specifically, although the above description illustratively uses digital subscriber line technology those of ordinary skill in the art will note that our invention may be extended to the placement of capacity at the nodes of a tree-shaped network.

We claim:

1. A method for determining placement sites for equipment within a geographic area in a telecommunications network comprising the steps of:
    determining a baseline architecture planning area having a tree structure wherein copper cables comprise the branches interconnecting cross-connects, central offices, and subscriber locations with associated socio-demographic data;
    determining a forecast of customer demand for digital subscriber line service within said baseline architecture planning area and fitting a mixed regressive spatial autoregressive logistic (MRSAL) model to selected socio-demographic data; and
    determining from said forecast the sites in said tree structure where the equipment is to be placed and the type and numbers of such equipment minimizing cost and satisfying design constraints.

2. The method in accordance with claim 1 further comprising the step of, based on the determination of sites, placing the specific equipment identified and the numbers of such equipment at said sites.

3. The method in accordance with claim 2 wherein said step of determining the forecast includes accessing a geographic information system containing socio-demographic information on the telecommunications subscribers within said geographic area.

4. The method in accordance with claim 3 wherein said step of determining said planning area includes the step of determining the boundary of said area based on socio-demographic data received from said geographic information system.

5. The method in accordance with claim 3 wherein said step of determining said planning area includes the step of creating a network tree having a central office and cross-connects interconnected by cables and subscriber stations connected to cables.

6. The method in accordance with claim 4 wherein said step of determining said forecast includes acquiring socio-demographic data from said geographic information system as to the central office locations within said boundary, the map of the copper cables within said boundary, subscriber income, and number of telephone lines within said boundary.

7. A method for determining placement sites for equipment within a geographic area in a telecommunication network comprising the steps of:
    determining a baseline architecture planning area having a tree structure wherein copper cables comprise the branches interconnecting cross-connects, central offices, and subscriber locations and determining the boundary of said area based on data received from a geographic information system;
    determining a forecast of customer demand for digital subscriber line service within said baseline architecture plannig area and using socio-demographic data for said planning area including accessing said geographic information system containing socio-demographic information on the telecommunications subscriber within said geographic area and acquiring data from said geographic information system as to the central office locations within said boundary, the map of the copper cables within said boundary, subscriber income, and number of telephone lines within said boundary, further includes fitting a mixed regressive spatial autoregressive logistic (MRSAL) model to selected data from said geographic information system;
    determining from said forecast the sites in said tree stucture where the equipment is to be placed and the type and numbers of such equipment minimizing cost and satisfying design constraints; and
    placing the specific equipment identified and the numbers of such equipment at said sites based on the determination of sites.

8. The method in accordance with claim 7 wherein MRSAL model is of the form $P(W; x_1, x_2, \ldots, x_k)=1/[1+\exp\{-(\alpha+\rho WP+\beta_1 x_1+\beta_2 x_2+ \ldots +\beta_k x_k)\}]$.

9. The method in accordance with claim 8 wherein all the values of W are equal to zero.

10. The method in accordance with claim 4 wherein said step of determining the sites for placement of equipment includes the steps of:
   normalizing the length of cable connected to said subscribers;
   determining how subscribers connect to the existing communications network;
   determining the available locations for placing the equipment;
   constructing a tree network connecting all said available sites; and
   optimizing where equipment should be placed at said sites to minimize the total costs of the equipment.

11. The method in accordance with claim 10 wherein said optimizing step is based on inputs including the set of equipment available to be placed, said tree network connecting all of the candidate equipment sites, and the maximum allowable distance between a subscriber and its serving equipment.

12. The method in accordance with claim 11 wherein said optimization step is performed with the constraints that no subscriber is too far from its serving equipment, no equipment serves more susbcribers than its allowed capacity, all subscribers are served at a site along a path to a central office, and any two subscribers whose copper cables meet on their path to their serving equipment are served at the same equipment location.

13. The method in accordance with claim 1 wherein said step of determining the forecast includes accessing a geographic information system containing socio-demographic information on the telecommunications subscribers within said geographic area.

14. The method in accordance with claim 13 wherein said step of determining said planning area includes the step of determining the boundary of said area based on socio-demographic data received from said geographic information system.

15. The method in accordance with claim 13 wherein said step of determining said planning area includes the step of creating a network tree having a central office and cross-connects interconnected by cables and subscriber stations connected to cables.

16. The method in accordance with claim 14 wherein said step of determining said forecast includes acquiring socio-demographic data from said geographic information system as to the central office locations within said boundary, the map of the copper cables within said boundary, subscriber income, and number of telephone lines within said boundary.

17. The method in accordance with claim 14 wherein said step of determining the sites for placement of equipment includes the steps of:
   normalizing the length of cable connected to said subscribers;
   determining how subscribers connect to the existing communications network;
   determining the available locations for placing the equipment;
   constructing a tree network connecting all said available sites; and
   optimizing where equipment should be placed at said sites to minimize the total costs of the equipment.

18. The method in accordance with claim 17 wherein said optimizing step is based on inputs including the set of equipment available to be placed, said tree network connecting all of the candidate equipment sites, and the maximum allowable distance between a subscriber and its serving equipment.

19. The method in accordance with claim 18 wherein said optimizing step is performed with the constraints that no subscriber is too far from its serving equipment, no equipment serves more subscribers than its allowed capacity, all subscribers are served at a site along a path to a central office, and any two subscribers whose copper cables meet on their path to their serving equipment are served at the same equipment location.

20. A method for determining placement sites for equipment within a geographic area in a telecommunications network having a tree structure wherein copper cables comprise the branches interconnecting cross-connects, central offices, and subscriber locations with associated socio-demographic data, comprising the steps of:
   determining a forecast of customer demand for broadband service within each node of said tree network using socio-demographic data for said geometric area; and fitting a mixed regressive spatial autoregressive logistic (MRSAL) model to selected socio-demographic data; and
   determining from said forecast the sites in said tree structure where the equipment is to be placed and the optimal types and numbers of such equipment minimizing cost and satisfying design and range constraints.

21. The method in accordance with claim 20 wherein the selected socio-demographic data is from a geographic information system.

22. The method in accordance with claim 20 wherein the MRSAL model is of the form $P(W; x_1, x_2, \ldots, x_k) = 1/[1+\exp\{-(\alpha+\rho WP+\beta_1 x_1+\beta_2 x_2+\ldots+\beta_k x_k)\}]$.

23. The method in accordance with claim 23 wherein all the values of W are equal to zero.

24. The method in accordance with claim 20 wherein said step of determining optimal sites, types and numbers of said equipment includes a dynamic programming optimization method to minimize the total cost of the placed equipment.

25. The method in accordance with claim 20 wherein said step of determining optimal sites, types and numbers of said equipment, while satisfying range constraints between each subscriber and its service equipment location, includes computing a function at each network node, where said function provides minimal cost equipment locations, types, and numbers for serving each amount of the forecasted demand within a respective node's subtree, and where said function for each respective node is computed using said function from each of a respective node's children.

26. The method in accordance with claim 20 wherein said step of determining optimal sites, types and numbers of such equipment, while satisfying range constraints from any subscriber to its assigned network node, includes a dynamic programming optimization method to minimize the total costs of placing the equipment.

27. The method in accordance with claim 20 further comprising the step of placing the equipment types identified and the numbers of such equipment at said optimal sites.

28. The method in accordance with claim 20 wherein said step of determining the optimal sites, types, and numbers of the equipment is based on inputs including the set of equipment available to be placed, the tree network connecting the equipment sites, and the maximum allowable distance between a subscriber and its serving equipment location.

29. The method in accordance with claim 20 wherein said step of determining optimal sites, types, and numbers of the equipment is performed with the constraints that no subscriber is too far from its serving equipment location, no equipment serves more subscribers than its allowed capacity, all subscribers are served at a site along a path to a central office, and any subscribers whose copper cables meet on their path to their serving equipment location are served at the same equipment location.

* * * * *